United States Patent Office 2,732,362
Patented Jan. 24, 1956

2,732,362
VULCANIZATION OF RUBBER WITH HEXA-CHLOROCYCLOPENTADIENE

Elbert C. Ladd, Passaic, N. J., assignor to United States Rubber Company, New York, N. Y., a corporation of New Jersey No Drawing. Application October 30, 1952,
Serial No. 317,829

5 Claims. (Cl. 260—41.5)

This invention relates to improvements in the vulcanization of rubber.

More particularly, the invention relates to a novel vulcanizing agent for rubbery sulfur-vulcanizable conjugated diene hydrocarbon polymers and copolymers broadly, including natural Hevea rubber (a polyisoprene), polybutadiene, butadiene-styrene copolymers (GR–S), butadiene-p-methylstyrene copolymers, and other such hydrocarbon rubbers which are similarly vulcanizable with sulfur. The rubber synthetic copolymers are produced in known manner by the copolymerization of a butadiene with one or more copolymerizable monovinyl hydrocarbons.

Although certain halogen compounds have been proposed heretofore for use as vulcanizing agents, I have found that various polyhalogeno compounds such as 1,1,2,3,4,4 - hexachloro - 1,3 - butadiene, 1,4 - dibromo-2 - butene, 1,2,2,3 - tetrachlorobutane, and 1,3,3,4,5,6-hexachlorohexane either have weak curing action on rubber or have no curing action at all.

I have discovered that hexachlorocyclopentadiene can be effectively used to vulcanize such rubbers as heretofore related, to either the soft or the hard rubber state, in the absence of sulfur; nor is zinc oxide or any metal oxide activator needed, although zinc oxide, magnesia, or litharge (0.5 to 20% on the rubber) accelerates the rate of reaction, and higher tensiles may be obtained in a shorter time with less vulcanizing agent when they are used. While the organic accelerators which are ordinarily used in curing rubber, with sulfur, including the thiazyl sulfide accelerators, e. g., 2-mercaptobenzothiazole, may be used to advantage, they are not essential. For the attainment of high tensiles in the synthetic rubber compositions carbon black or other reinforcing filler should be incorporated.

The ethylenically unsaturated hydrocarbon rubbers, including natural rubber, are vulcanized according to my invention by mixing the rubber with the hexachlorocyclopentadiene and heating the mixture. The amount of the curing agent useful in giving soft vulcanizates ordinarily ranges from about 1% to about 5% of the weight of the rubber. Larger amounts of the curing agent, up to as much as 200%, can be used to produce increasingly harder and more rigid products.

The following data in Table I, in which the parts are by weight, illustrate the invention, in comparison with controls using no vulcanizing agent.

Table I

| | A | B | C | D | E | F | G | H | I | J | K |
|---|---|---|---|---|---|---|---|---|---|---|---|
| Composition: | | | | | | | | | | | |
| GR–S Rubber | 100 | 100 | 100 | | 100 | 100 | | 100 | 100 | 100 | 100 |
| Hevea Rubber | | | | | | | 100 | | | | |
| Rubbery Polybutadiene | | | | 100 | | | | | | | |
| Carbon black | 50 | | 50 | | 50 | 50 | 50 | 50 | 50 | 50 | 50 |
| Zinc Oxide | 2 | | 10 | | | 3 | 10 | 5 | 10 | 5 | 5 |
| 2-Mercapto-benzothiazole | | | | | | | | 1.5 | 1.5 | | 1.5 |
| Hexachlorocyclopentadiene | 2 | 200 | | 200 | | 3 | 3 | 2 | | 3 | 3 |
| Cure: | | | | | | | | | | | |
| Time of Cure (Hrs.) | 1 | 60 | 1 | 60 | 1 | 1 | 1 | 1 | 1 | .5 | .5 |
| Temp. (° F.) of Cure | 293 | 257 | 293 | 293 | 293 | 293 | 293 | 293 | 293 | 293 | 293 |
| Properties: | | | | | | | | | | | |
| Tensile (lbs./sq. in.) | 2,290 | | 228 | | 130 | 2,250 | 1,980 | 2,040 | ca. 0 | 2,700 | 2,780 |
| Elongation at Break | 380 | | 580 | | 320 | 380 | 310 | 450 | | 390 | 430 |
| 300% Modulus | 1,050 | | 125 | | 125 | | | | | | |
| Hardness (Shore D) | | 65 | | 80 | | | | | | | |

The vulcanized products of my invention are insoluble in benzene.

The vulcanizing agent of this invention may be used with any of the softeners, peptizing agents, fillers and other types of compounding ingredients commonly used with butadiene copolymer rubbers.

A variation of the combination of hexachlorocyclopentadiene with an olefinic hydrocarbon rubber is shown as follows, using an excess of the reagent.

Ten grams of sodium-polymerized rubbery polybutadiene are dissolved in 200 grams of hexachlorocyclopentadiene and the solution is heated at 150–190° C. for 2.5 hours. Then the resulting reaction mixture, a homogeneous solution, is cooled to room temperature and poured into acetone. The soft coagulum thus precipitated is washed several times, with acetone, then is dried (de-solvated) by vacuum. The product is a brown, hard, brittle, fusible resin, soluble in benzene.

It can be used for the manufacture of molded articles of marked flame-resistance.

Analysis: chlorine, 53.6%.

The product accordingly has been formed by the combination of about one mole of hexachlorocyclopentadiene for each two $C_4H_6$ units of the polybutadiene.

The product becomes insoluble in benzene upon being heated for two hours at 150° C.

Having thus described my invention, what I claim and desire to protect by Letters Patent is:

1. A process of vulcanizing a sulfur-vulcanizable rubbery hydrocarbon polymerizate derived from a conjugated diene which comprises heating the same in the presence of at least about one percent by weight, based on the rubbery polymerizate, of hexachlorocyclopentadiene at a temperature and for a time sufficient to vulcanize the polymerizate.

2. A process of vulcanizing a sulfur-vulcanizable rubbery hydrocarbon polymerizate derived from a conjugated diene which comprises heating the same in the presence of at least about one percent by weight, based on the rubbery polymerizate, of hexachlorocyclopentadiene and a metal oxide from the group consisting of zinc oxide, magnesia, and litharge, at a temperature and for a time sufficient to vulcanize the polymerizate.

3. A process of vulcanizing a sulfur-vulcanizable rubbery hydrocarbon polymerizate derived from a conjugated diene which comprises heating the same in the presence of at least about one percent by weight, based on the rubbery polymerizate, of hexachlorocyclopentadiene and zinc oxide, at a temperature and for a time sufficient to vulcanize the polymerizate.

4. The rubbery heat-reaction product of an olefinic hydrocarbon rubber with about one to about five percent by weight of hexachlorocyclopentadiene resulting from heating a mixture of the rubber and the said diene.

5. A rubbery to resinous heat-reaction product of a sulfur-vulcanizable rubbery hydrocarbon polymerizate derived from heating a conjugated diene with about one to about two hundred percent by weight of hexachlorocyclopentadiene.

References Cited in the file of this patent

UNITED STATES PATENTS

| | | |
|---|---|---|
| 2,478,036 | Baum | Aug. 2, 1949 |
| 2,504,295 | Beaver | Apr. 18, 1950 |
| 2,567,135 | Sturgis et al. | Sept. 4, 1951 |
| 2,598,561 | Kleiman | May 27, 1952 |